United States Patent
Babai

(10) Patent No.: US 6,649,123 B2
(45) Date of Patent: Nov. 18, 2003

(54) APPARATUS FOR THE SCANNING OF WORKING LEVELS

(75) Inventor: Atila Babai, Guesen (DE)

(73) Assignee: ABA Geräte- & Maschinenbau GmbH., Zielitz (DE)

( * ) Notice: Subject to any disclaimer, the term of this patent is extended or adjusted under 35 U.S.C. 154(b) by 48 days.

(21) Appl. No.: 09/789,684

(22) Filed: Feb. 20, 2001

(65) Prior Publication Data

US 2001/0015514 A1 Aug. 23, 2001

(30) Foreign Application Priority Data

Feb. 21, 2000 (DE) .......................................... 100 07 874

(51) Int. Cl.$^7$ ................................................ B23K 7/10
(52) U.S. Cl. .......................................... 266/76; 266/48
(58) Field of Search ...................... 266/48, 76; 148/194

(56) References Cited

U.S. PATENT DOCUMENTS

| | | | | |
|---|---|---|---|---|
| 2,747,152 A | * | 5/1956 | Greene | 266/76 |
| 3,983,358 A | * | 9/1976 | Karlen | 219/124 |
| 4,168,822 A | * | 9/1979 | Ogden | 266/76 |
| 5,904,867 A | * | 5/1999 | Herke | 266/76 |

FOREIGN PATENT DOCUMENTS

DE   299 05 304.0   9/1999

* cited by examiner

Primary Examiner—Scott Kastler
(74) Attorney, Agent, or Firm—Karl Hormann

(57) ABSTRACT

An apparatus for scanning the working level of a cutting tool relative to the surface of a workpiece and provided with a scanning arm adapted to move relative to the surface of the work piece and movable in response to an irregularity in the surface for opening a switch thereby to disconnect the cutting tool from a source of power.

12 Claims, 3 Drawing Sheets

APPARATUS FOR THE SCANNING OF WORKING LEVELS

BACKGROUND OF THE INVENTION

1. Field of the Invention

The invention, in general, relates to an apparatus for the scanning of working levels and, more particularly, to an apparatus for scanning the working level between a cutting tool and a cutting surface in water jet cutting machines and laser cutting machines for the prevention of damage to tools as may otherwise result from collision.

2. The Prior Art

Apparatus manually adjustable and controllable by an operator and provided with sensors for scanning working levels are known. They do, however, suffer from such drawbacks as requiring extreme attention on the part of the operator and their sensors being easily be damaged by a reflected water jet or by abrasion. Such apparatus are generally incapable of detecting very small surface irregularities such as burrs, scales, dripping residues or rust, so that there is always a high risk of damage to their cutting tools.

German Utility Model U1 299 05 304.0 discloses a pneumatic device for water jet and laser cutting machines which seeks to avoid collisions between the cutting tool and surface irregularities in the cutting material by dynamically scanning the surface.

One disadvantage of such devices is that at the occurrence of a mechanical overload as may be caused by a collision of the tool, the sluggishness of the pneumatic drive and the slow rate at which such devices process measured values, they offer no reliable protection from damage to the cutting tool. Since neither the speed of response of such devices nor stroke and surface pressure of the scanning arm can be set or programmed by an operator, damage to costly sensitive material as a result of scratches is rather likely.

OBJECTS OF THE INVENTION

It is a general object of the invention to provide an electro-mechanical apparatus for scanning the working level of water jet and laser cutting devices.

A more specific object of the invention resides in the provision of an apparatus for scanning the working level of a water jet or laser cutting machine whose scanning arm surface pressure on the material to be cut may be programmed.

Yet another object of the invention is to provide an apparatus for scanning the working level of a water jet or laser cutting machine which is provided with collision protection means of adjustable sensitivity or responsiveness.

Still another object of the invention resides in the provision of a scanning apparatus of the kind referred to which prevents mechanical overloads of the cutting device.

BRIEF SUMMARY OF THE INVENTION

In the accomplishment of these and other objects, the present invention, in a preferred embodiment thereof, provides an apparatus for scanning the working level of a water jet or laser cutting tool provided with a scanning arm which is movable into its operating position by a linear motor and the surface pressure of which is electrically or mechanically adjustable and controllable throughout its entire stroke, in dependency of the material to be treated. Alternatively, the scanning arm may be programmed to any position along its stroke.

Preferably, the linear motor unit including a linear slide and linear guide rod of the scanning arm as well the scanning arm mounted on the linear guide rod are mounted for substantially omnidirectional pivotal movement by a flexible mount and/or ball joint seated in a cantilever, the linear motor unit being maintained in a stable neutral position by at least one spring arranged between the linear motor unit and the cantilever.

A collision switch structured as a well known inductive proximity switch may be actuated by a link connected to the linear motor unit.

The link is movably connected to the linear motor unit and may be pivotally and slidingly moved in a fulcrum in a support, support and fulcrum being mounted on a spindle and may be adjusted relative thereto for changing the transmission ratio of the lever arrangement.

Other objects and advantages will in part be obvious and will in part appear hereinafter.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENT

Figure 1:
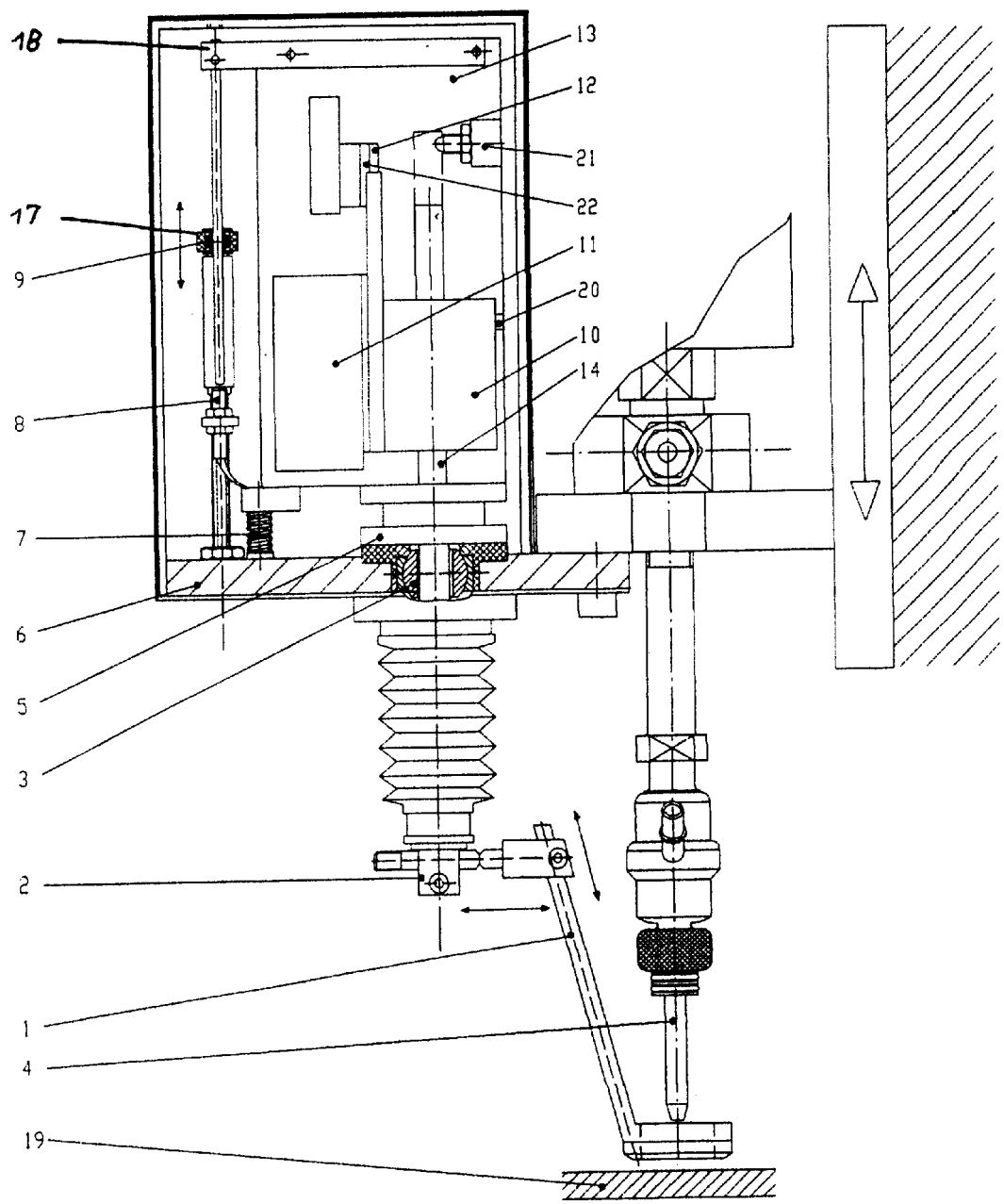
FIG. 1 is a schematic frontal view of a scanning apparatus mounted on the tool support of a cutting device, partially in section.
Figure 2:
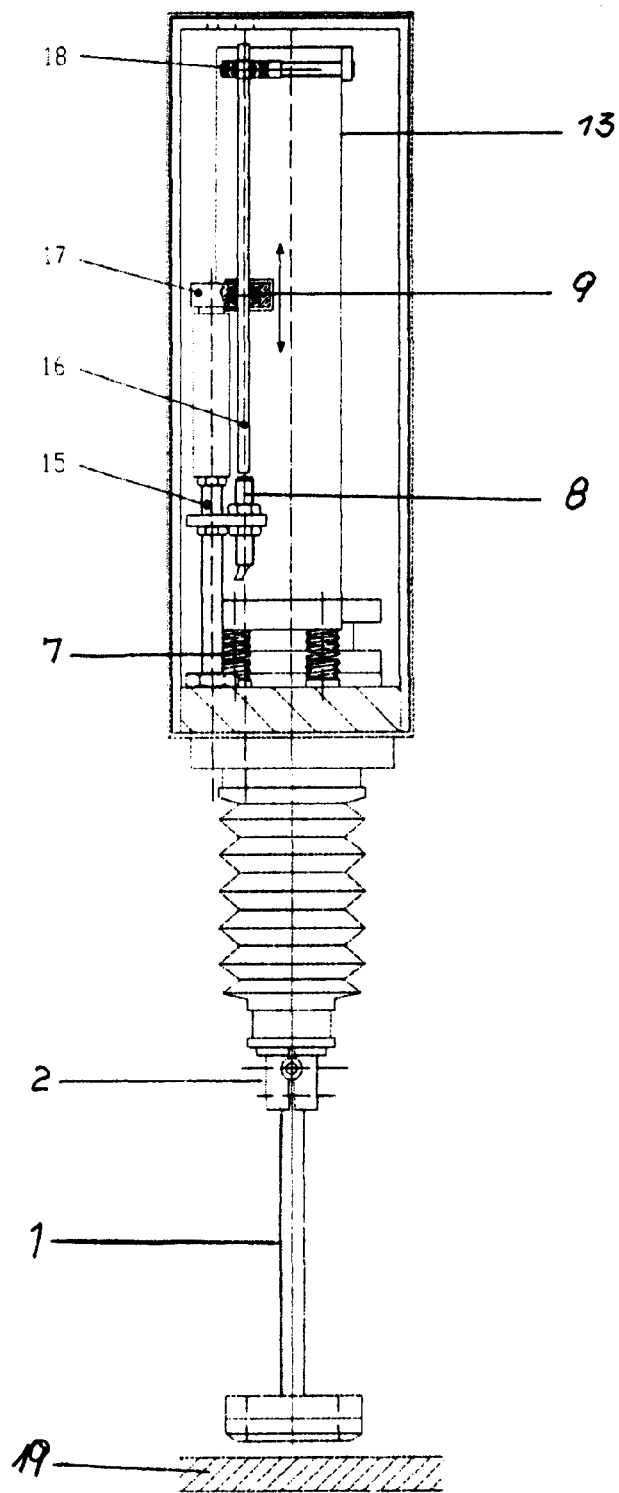
FIG. 2 is a schematic side view of the scanning apparatus of FIG. 1 in an operative state.

A linear motor unit 13 is seen to be mounted on a cantilever 6 extending from a tool support of a cutting tool 4. The tool 4 may be a water jet or a laser diode of the kind well known in the art. The linear motor unit 13 is mounted on the cantilever 6 by means of a ball joint 3 and flexible mount 5 and is supported in a predetermined neutral position by a spring 7 extending between the unit 13 and the cantilever 6.

The linear motor 11 itself is mounted for sliding movement on a linear guide rod 14 by means of a linear slide bracket 10. The bracket 10 is secured against rotary movement by an appropriate latch 20. The linear guide rod 14 extends through the ball joint 3 in the cantilever 6 and is provided at one of its ends with a guide head or chuck 2. A scanning arm 1 is mounted on the guide head or chuck 2 for sliding movement as well as for pivotal movement in one plane. The connection between the chuck 2 and the scanning arm 1 includes a breaking point of the kind well known in the art and designed to brake the arm off the chuck when a force exerted on the arm exceeds a certain level.

The scanning arm 1 preferably is a hollow tube and may be connected, at its upper end, to a source of water or pressurized gas (not shown). An annular support or foot at the lower end of the scanning arm 1 is provided with nozzles directed toward the material 19 to be cut so that a protective fluid cushion may be formed between the foot and the surface to be cut.

Within the linear motor unit 13 there is provided a transparent scale 12 made of glass or the like. The scale 12 communicates with an optical encoder 22 which is provided in the interior of linear motor unit 13 as well.

Figure 3:
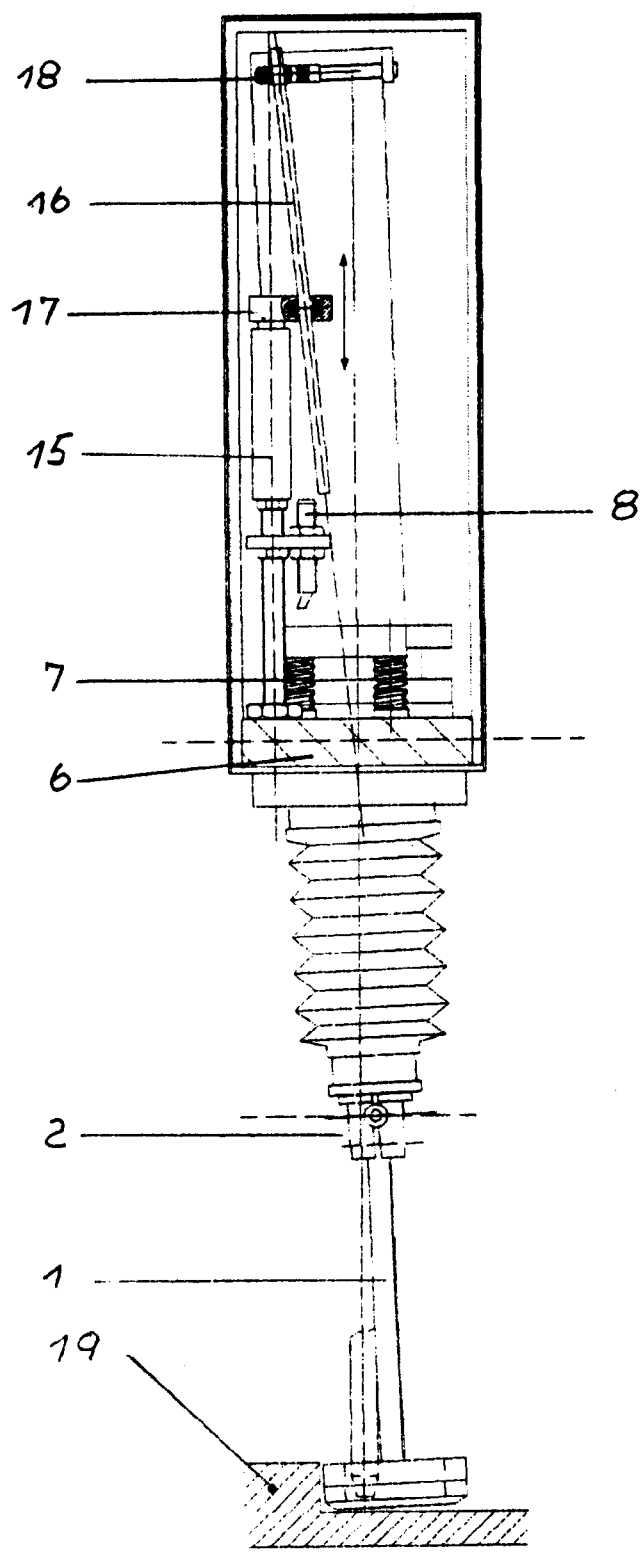
FIG. 3 is a schematic view similar to FIG. 2 with the apparatus in a state of collision.

A spindle 15 is disposed substantially parallel to the linear guide rod 14, and a longitudinally or vertically adjustable support 17 with a pivotal bearing or fulcrum 9 is mounted on the spindle 15. A collision switch 8 structured as an inductive proximity switch is seated below the fulcrum 9. At its furthest point from the ball joint 3 the linear motor unit 13 is connected by a rotary bearing 18 and a cantilever to a link 16. The connection, i.e. the rotary bearing 18, between the link 16 and the cantilever constitutes a gimbal and by adjusting the fulcrum 9 along the lever 16 by movement of the support 17, the transmission ratio of the link 16 may be changed. The end of the link 16 opposite the rotary joint 18 constitutes one pole of a collision switch 8 and serves at times to open the switch 8 (see FIG. 3) to switch off the cutting device. The link 16 slidingly extends through the fulcrum 9 associated with the vertically adjustable support 17. In a normal state of operation of the water jet or laser cutting device the joint 18, the fulcrum 9 and the collision switch 8 are in axial alignment and the cutting device will be in an energized state by way of electrical contacts of the inductive proximity switch.

For purposes of operating the apparatus, the cutting tool 4 is properly placed relative to the material 19 to be cut and the working distance between cutting tool 4 and the surface of the material 19 is programmed or set. The support pressure of the scanning arm 1 is also programmed or set. The sensitivity of the collision switch 8 is set by means of the support 17 of the fulcrum 9 on the spindle 15 by positioning the support 17 close to or remote from the collision switch 8, thus realizing different transmission ratios of the link 16. Positioning the fulcrum 9 close to the collision switch 8 denotes "not sensitive" whereas positioning it remote from the switch denotes "sensitive". As soon as the water cutting device is in an operative state and a surface irregularity of the material 19 being cut is detected by the engagement of the scanning arm 1 on the material, the scanning arm 1 will pivot in an evasive direction and transmit the deflection to the linear motor unit 13 by way of the linear guide rod 14 and, by way of the joint 18, to the link 16 guided by the fulcrum 9.

The deflective movement causes the collision switch 8 to move out of its aligned position relative to the link 16 thereby turning off the cutting device in time to prevent damage or destruction of the expensive cutting tool.

The advantages of the apparatus in accordance with the invention are, among others, that the use of a linear motor for placing a scanning arm on the surface of material to be cut yields a high reaction speed. This, in turn, results in a precision or accuracy of a programmable or controllable load pressure on the surface of about 0.05 N for each point along the stroke. Because of reduced friction, augmented by fluid pressure at the bearing seat, between the scanning arm and the surface, the cutting machine may be operated at a higher speed. It also allows the material to be cut to be held down more securely.

Minimum spacing between the cutting tool and the surface of the material to be cut is can be attained as the values obtained by the transparent scale and an optical encoder can be used directly to control the cutting tool at a precision of about 0.01 mm.

Furthermore, because of the increased sensitivity of the scanning apparatus the water jet or laser cutting tool can be reliably shut down before it may become damaged as a result of a collision. The sensitivity or responsiveness of the apparatus may easily be adjusted by changing the transmission ratio of the link in accordance with different requirements.

What is claimed is:

1. An apparatus for scanning the working level of a cutting device relative to a work surface, comprising:

a scanning arm mounted for resilient pivotal movement between first and second positions relative to the cutting device;

a linear motor connected to one end of the scanning arm for movement thereof relative to the work surface;

a switch for connecting the cutting device to a source of power;

means connecting the scanning arm to the switch and responsive to pivotal movement of the scanning arm to the second position for opening the switch and disconnect the cutting device from the source of power.

2. The apparatus of claim 1, wherein the linear motor and the scanning arm are mounted for pivotal movement in a support bracket of the cutting device.

3. The apparatus of claim 1, wherein the means for connecting the scanning arm to the switch comprises a link mounted for pivotal movement about a fulcrum.

4. The apparatus of claim 3, wherein the position of the fulcrum is adjustable for changing the transmission ratio of the link.

5. The apparatus of claim 1, wherein the linear motor is secured against rotary movement.

6. The apparatus of claim 1, wherein the linear motor and the scanning arm are connected by a chuck and wherein one of the scanning arm and the chuck is provided with a breaking point.

7. The apparatus of claim 6, wherein the scanning arm is mounted for linear and pivotal movement relative to the linear motor.

8. The apparatus of claim 1, wherein the scanning arm comprises a tubular member connected to a source of fluid pressure.

9. The apparatus of claim 8, wherein the end of the scanning arm opposite the one end is provided with a foot.

10. The apparatus of claim 9, wherein the foot comprises nozzles for emitting fluid pressure against the work surface.

11. The apparatus of claim 1, wherein the linear motor is mounted for sliding movement on a guide rod.

12. The apparatus of claim 11, wherein the guide rod is provided with means for arresting the linear motor.

* * * * *